United States Patent [19]

Mary

[11] Patent Number: 5,412,724
[45] Date of Patent: May 2, 1995

[54] METHOD OF MAKING UP A DIGITAL MULTIPLEX, AND APPARATUS IMPLEMENTING SAID METHOD

[75] Inventor: Jean Mary, Orsay, France

[73] Assignee: Matra Communication, Quimper, France

[21] Appl. No.: 165,479

[22] Filed: Dec. 13, 1993

[30] Foreign Application Priority Data

Dec. 15, 1992 [FR] France ............... 92 15103

[51] Int. Cl.⁶ ............................................. H04N 7/167
[52] U.S. Cl. ........................................ 380/20; 380/10; 380/49
[58] Field of Search ............................. 380/20, 10, 49

[56] References Cited

U.S. PATENT DOCUMENTS

| | | | |
|---|---|---|---|
| 4,744,080 | 5/1988 | Brennand et al. | 280/21 |
| 4,748,619 | 5/1988 | Vigarie et al. | 370/94 |
| 4,797,919 | 1/1989 | Murray et al. | 380/20 |
| 4,873,689 | 10/1989 | Pellerin | 371/37.1 |
| 5,274,674 | 12/1993 | Lafon | 375/76 |

FOREIGN PATENT DOCUMENTS 8701484 3/1987 WIPO.

OTHER PUBLICATIONS

Mertens, et al. "The C-MAC/packet system for direct satellite television" *EBU Review—Technical*, Aug. 1983, pp. 172–176.

"Specification of the D2-MAC/Packet System" Sep. 1985, pp. 23, 37–39.

Commutation et Transmission, vol. 12, No. 4, 1990, Paris FR pp. 65–76 Vigarie et al. "Visiopass: Points d'émission D2 MAC Paquet".

5. Conference and Exhibition on Television Techniques 12–14 Jun. 1990 vol. II, Budapest, pp. 257–263 Kovacs 'C-, "D–D2–MAC/Packet Signal Generator", p. 253, 1. 1–p.262, 1. 18.

IBA Technical Review, No. 24, Nov. 1988, Winchester GB, pp. 48–49 "Data Broadcasting".

*Primary Examiner*—David C. Cain
*Attorney, Agent, or Firm*—Larson and Taylor

[57] ABSTRACT

The method is for generating a digital multiplex signal for broadcasting. The multiplex is made up of packets of determined length coming from a plurality of sources, by applying a treatment selected from those belonging to a catalog of stored treatments. It is applicable to D2-MAC/packet and digital TV. An encoder implementing the method has sources in which the identity of the treatment to be performed is inserted in a field provided for this purpose in each packet precursor. Downstream from the sources, the encoder comprises a treatment unit for decoding the field and for causing the treatment defined by the field to be applied.

9 Claims, 1 Drawing Sheet

METHOD OF MAKING UP A DIGITAL MULTIPLEX, AND APPARATUS IMPLEMENTING SAID METHOD

BACKGROUND OF THE INVENTION

The present invention relates to a method of making up a digital multiplex to be transmitted or broadcast, said multiplex being made up of packets originating from a plurality of sources with at least some of them being derived from respective packet precursors from the sources by application of a treatment selected from treatments belonging to a catalog of stored treatments. The term "packet precursor" is used to designate data already distributed in packets, but in a form that is not yet that in which the packets are subsequently transmitted or broadcast.

The invention is suitable for use when digital packets, originating from different sources, should each be subjected in real time to a predetermined treatment among a plurality of treatments before transmission or broadcast as a continuous stream. However an important, but non-exclusive, application of the invention lies in making up a digital multiplex of the kind that may be called X/packet, as defined by that portion of the document "Specification of the D2-MAC packet system" of September 1985 that is concerned with the digital portion of a television signal, the multiplex possibly being used alone, for instance for digital TV, or combined with an analog portion for instance in a D2-MAC/packet signal.

In the D2-MAC digital multiplex signal, the stream of bits for transmitting and broadcasting sound and data is split up into packets of 751 bits each, each packet having a useful working portion and also a 23-bit address enabling the origin of the packet to be identified. Prior to multiplexing with the analog signal and depending on its origin and/or nature, each packet is subjected to different treatment.

In the particular case of D2-MAC/packet, certain treatments are performed on all of the packets: packet headers, containing the addresses, are protected by inserting a Golay code; the packets are interlaced.

Other treatments are applied to some packets only, for example those belonging to the zero channel. Still in the case of D2-MAC/packet, packets representing data are protected by a cyclic redundancy check (CRC) and by a Golay code. Finally, packets corresponding to a program having conditional access are scrambled.

Treatments also need to be performed on packets in the case of a signal that may be called a full-time X/packet signal, e.g. the signal obtained by applying the method described and claimed in EP-A-0,552,099.

For greater simplicity, the description below relates essentially to generating a digital multiplex signal for incorporation in a D2-MAC/packet signal; however this is an example only.

An advantageous solution consists in performing all the treatments in the same processing unit, which receives messages from packet sources. These messages are referred to below as "packet precursors" to show clearly that they are not packets in their final form for broadcasting. This removes the need to provide each source of packets that are to be subjected to the same treatment with the means for performing that treatment.

The approach that comes to mind consists in sending an instruction to the processing unit on each arrival of a packet precursor that is intended to give rise to a packet for broadcasting, with the instruction identifying the packet and the treatment that is to be applied to the packet. This means that time coherence must be maintained for changes that take place in the sources and for changes that take place in the processing unit.

SUMMARY OF THE INVENTION

It is a general object of the invention to provide a method of making up a digital multiplex signal of the kind defined above that makes it possible to simplify the treatment and to improve security. It is important to keep in mind that it is fairly different from any attempt to intervene on a communication protocol.

To this end, there is provided a method including adding an identification field to each packet precursor, in each respective source. That field identifies the treatment to be performed on the packet precursor. A processing unit storing the various possible treatments to be performed applies the treatment defined by the contents of the identification field.

The invention also provides an encoder for implementing the above-defined method. The encoder comprises sources of standardized packets and a processing unit in which the various treatments to be performed are stored. The sources additionally include means for inserting the identity of the treatment to be performed in a field provided for this purpose in each packet precursor. The processing unit includes means to decode the field and to apply the treatment defined by the field.

In particular, the identification field may comprise bits specifying:

whether the packet is to be protected by cyclic redundancy check (CRC), which requires one bit;

whether the data portion is to be protected by a Golay code (or another block protection code), which requires one bit;

whether the data is to be scrambled;

if scrambling is to be performed, which scrambling mode or which scrambler order number is to be used; and in the event that a plurality of processing units are provided, which unit is to be used.

The functions to be performed can be provided in an encoder by means of a programmed apparatus, a hardwired apparatus, or even an application-specific integrated circuit (ASIC). An ASIC can easily incorporate a plurality of scamblers and can be designed for a circuit comprising a plurality of ASICs in parallel. This latter option is particularly advantageous when the encoder is for a full-time X/packet signal, suitable for digital television.

The invention will be better understood from the following description of a particular embodiment given by way of non-limiting example. The description refers to the accompanying drawings.

DETAILED DESCRIPTION

There now follows a description of the general structure only of those components in a D2-MAC/packet encoder which are concerned by the invention. The remainder of the encoder may be conventional in structure, for example as described in French patent application No. FR 86 03831 (publication No. 2,596,228). The disposition described is directly transposable to generating any kind of X/packet signal.

Figure 1:
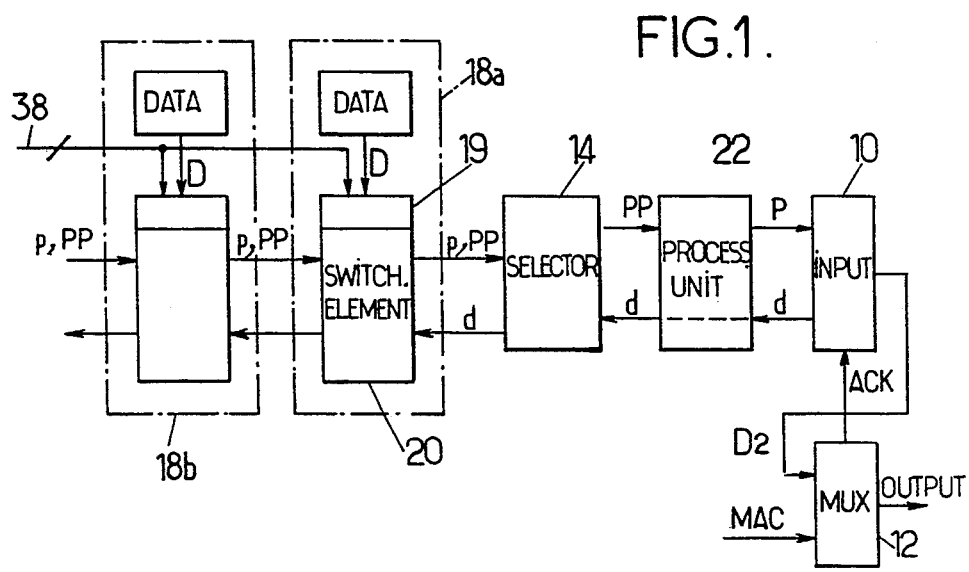
FIG. 1 is a block diagram showing an association of packet sources and a processing unit.

The assembly shown by way of example in FIG. 1 is similar in general structure to that described in European patent No. 0514796, to which reference may be made. It is designed to deliver, to the input member 10 of an output channel, packets for making up the duobinary encoded digital portion of a time multiplex in baseband that is formed by a multiplexer 12. For this purpose, the input member 10 is designed, in conventional manner, to send packet requests d as a function of availability, and to distribute the packets p that it receives in bursts.

All of the packet sources may have the same structure but may be intended, for example, to provide packets from different origins (corresponding to different TV programs) or packets of various priorities. Each source, e.g. 18a, includes a switching circuit 20 and a circuit 19 that may be considered as a circuit for preparing data in the form of "packet precursors" PP. In response to an instruction coming from a packet multiplexing selector 14, the switching circuits 20 of the various sources 18 enable that one of the packet precursors PP which has the highest priority p to be sent downstream together with its identification (or identity) field. The priority p and the packet PP travel in succession along the same path.

A processing unit 22 is interposed between the selector 14 and the input member 10, and its function is to process each packet precursor in appropriate manner to give rise to a packet of determined format and length (packets of 751 bits in the case of D-MAC and of D2-MAC/packet). Each packet precursor PP can then be formed by adding a (prefix or suffix) field to a group of data D having a non-encoded header that is destined to give rise to the packet header, which field is of a size sufficient for identifying all of the available treatments and possible combinations thereof (e.g. scrambling after applying an error-protection code). No error protection is required for transfers within the encoder since such transfers are not subjected to the disturbances caused by a transmission channel.

The processing unit 22 includes a plurality of operators, each corresponding to a particular treatment and identified by a word of one or more bits provided in the identity field.

Figure 2:
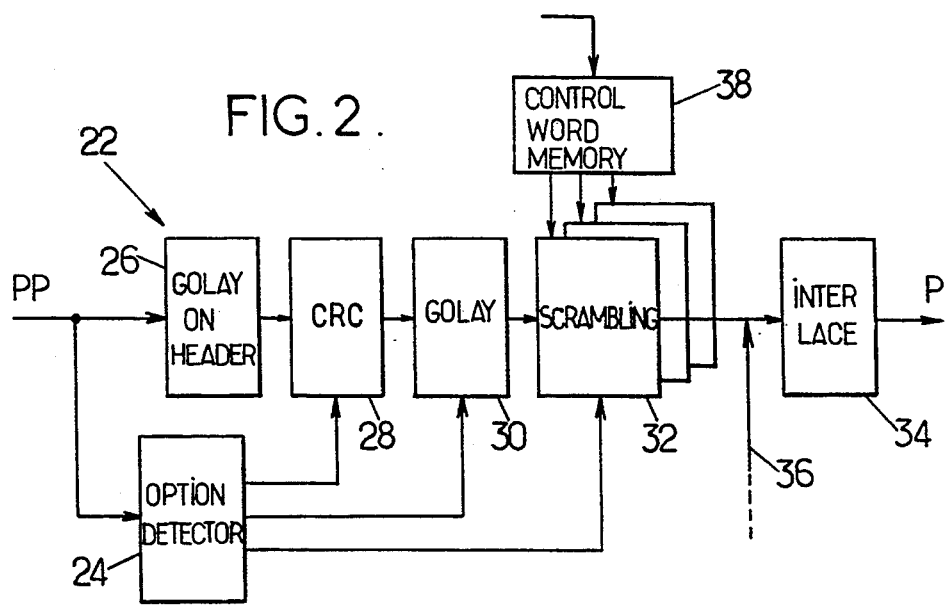
FIG. 2 is a block diagram showing one possible structure of a processing unit suitable for use in the circuit of FIG. 1.

One possible structure for the unit 22 is given in FIG. 2. In FIG. 2, elements of conventional design such as the time base and the means for detecting the beginnings of the packet precursors are omitted.

The unit 22 has two branches, one of which contains the operators and the other of which includes an option detector 24 and decodes the identification field of each packet precursor PP and, as a function of the contents of the received field, it provides an enabling signal on one or more outputs to the operators that are connected in cascade (or optionally in parallel for treatments that are not suitable for being combined and that are applied to different packets).

The operators may include:
an operator 26 for applying a Golay code to the packet headers;
an operator 28 for adding a packet suffix that serves to protect packets by a cyclic redundancy check;
a Golay operator for protecting the data;
one or more scrambling operators 32, the output from the detector 24 connected to the scramblers enabling a particular one of them to be selected, e.g. by specifying a scrambler number; and
an interlace operator 34.

Some of the treatments may be performed systematically, i.e. on all of the packets. Under such circumstances, there is no need to provide an output from the detector 24 to the corresponding operators. In FIG. 2, this applies to operators 26 and 34.

To enable operators to be selected, the identity field present in each packet precursor may include:
a bit specifying whether CRC protection is to be applied;
a bit specifying whether Golay protection is to be applied to the data (the header is always protected);
a bit specifying whether the packet is to be scrambled, plus four additional bits then used for specifying the number of the scrambler to be used; and
when a plurality of treatment units are connected in parallel, all feeding the same interlacer 34 (as represented by a link 36, generally a three-state link), four bits specifying the order number of the treatment unit that is to be used.

The control words for use by the scramblers may be preloaded in a memory 38 which is connected to a control word generator (not shown) associated with a conditional access system of any type.

The detector 24 may be designed to apply instructions to the operators only when the treatment to be performed is changed. Under such circumstances, the operators are designed to repeat the same treatment on successive packets until they receive an order specifying a new treatment. In a modified embodiment, the instructions defining the treatment to be performed are issued by the option detector 24 on the arrival of each packet.

The apparatus may be provided for possible modification of the priorities by orders delivered to the sources on a line 38.

Numerous structures other than that described above are possible and the treatments applied may be of very diverse natures. In all cases, the overall structure of the system is very simple since the sources need only store and insert identity words and since the processing unit receives information about the treatment to be performed in complete synchronism with each packet precursor.

I claim:

1. A method for forming a digital multiplex signal to be transmitted or broadcast, comprising a sequence of packets of predetermined length, comprising the steps of:

providing a plurality of sources of packet precursors each including data to be included in a respective packet, in each source, adding a digital identification field identifying one process to be applied among a catalog of predetermined processes, to each packet precursor delivered by the source, storing all said processes in a memory, and subjecting each said packet precursor in turn to the process which is defined by the identification field thereof in processing means provided with said memory to constitute a respective packet, prior to transmission or broadcasting.

2. Method according to claim 1, wherein said identification field includes bits indicating whether one at least of the following processes is to by applied by said processing means:
   protection of the data in the packet by a Golay code, scrambling, and
   protection of the data by cyclic redundancy control.

3. Encoding unit for generating a digital multiplex signal to be transmitted or broadcast, said multiplex signal comprising a plurality of successive digital packets of predetermined length, said encoding unit comprising:
   a plurality of data sources each for generating packet precursors having a data portion and an identification field indicating a particular process, if any, among a plurality of predetermined processes, to apply to the respective packet precursor for generating one packet; and
   an encoder connected to receive said packet precursors in sequence and having memory means storing said predetermined processes, decoding means for decoding the identification field of each said packet precursor, and processing means for applying, to each said packet precursor, the process defined by the identification field thereof.

4. An encoder according to claim 3, wherein all of the sources are of the same structure.

5. An encoder according to claim 3, wherein the processing means include operators in cascade, at least some of which enable optional treatments to be performed on receipt of an order received from the decoding means.

6. An encoder according to claim 5, further including other operators performing treatments systematically on all of the packet precursors.

7. An encoder according to claim 5, wherein some of said operators are provided to perform at least one of the following stored treatments:
   protection by cyclic redundancy check;
   protection by a Golay code; and
   data scrambling.

8. An encoder according to claim 5, wherein said processing means are constructed to continue applying the same treatment on all received packet precursors until a modification order is received from the decoding means.

9. An encoder according to claim 5, wherein said processing means are constructed to perform, on each packet precursor, treatments indicated by the field of said packet precursor.

* * * * *